April 25, 1933. R. F. SCOTT 1,905,952
STEERING MECHANISM FOR TRACTORS HAVING ENDLESS TREAD MEMBERS
Filed Dec. 26, 1929 2 Sheets-Sheet 1

R. F. Scott
Inventor
By C. A. Snow & Co.
Attorneys.

April 25, 1933.   R. F. SCOTT   1,905,952
STEERING MECHANISM FOR TRACTORS HAVING ENDLESS TREAD MEMBERS
Filed Dec. 26, 1929   2 Sheets-Sheet 2

R. F. Scott
Inventor
By C.A.Snow&Co.
Attorneys.

Patented Apr. 25, 1933

1,905,952

UNITED STATES PATENT OFFICE

ROBERT F. SCOTT, OF CHARLESTON, WEST VIRGINIA

STEERING MECHANISM FOR TRACTORS HAVING ENDLESS TREAD MEMBERS

Application filed December 26, 1929. Serial No. 416,702.

This invention has reference to tractors or similar machines having endless tread members, the primary object of the invention being to provide novel means for steering the machine by the application of power to the endless tread members at opposite sides of the machine, in opposite directions.

Another object of the invention is to provide steering means of this character which may be operated to cause the tractor or machine to turn rapidly in a comparatively small space.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 2:
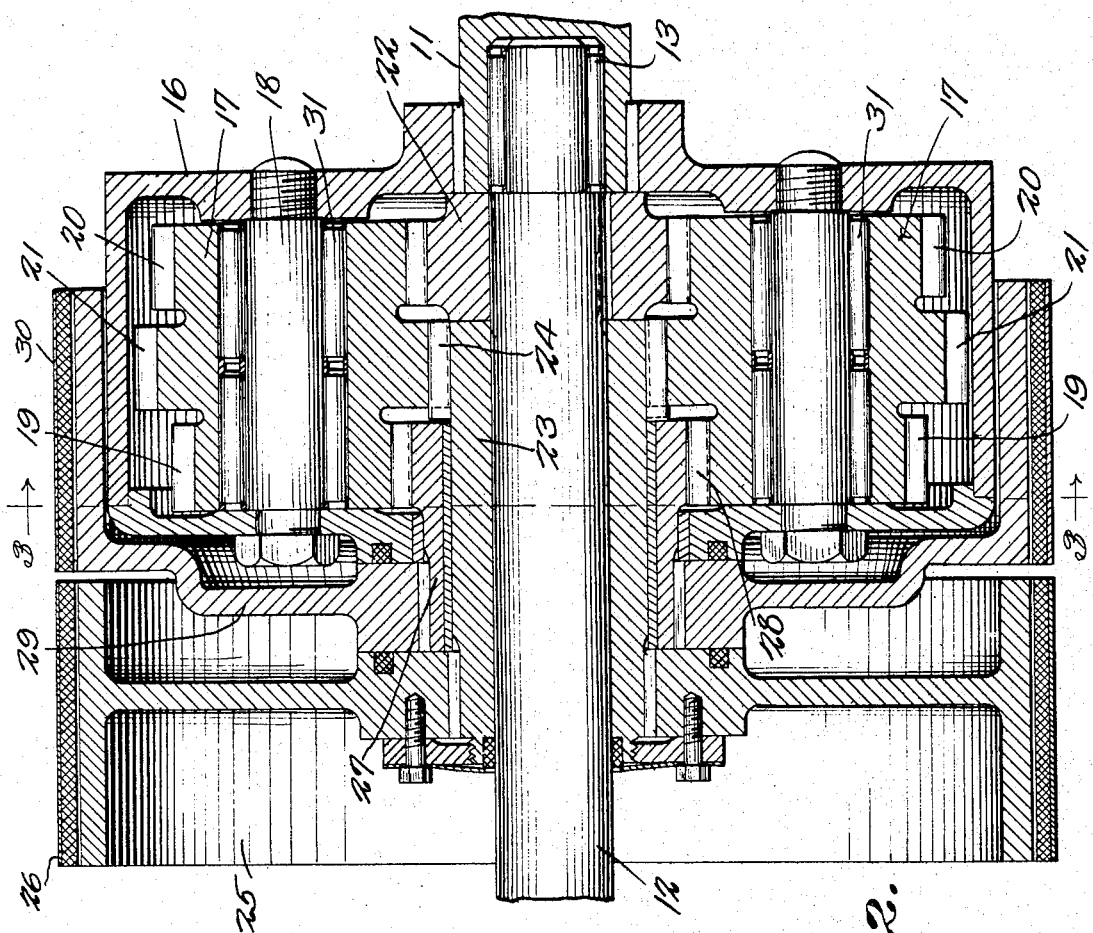
Figure 2 is a longitudinal sectional view through the gearing.
Figure 1:
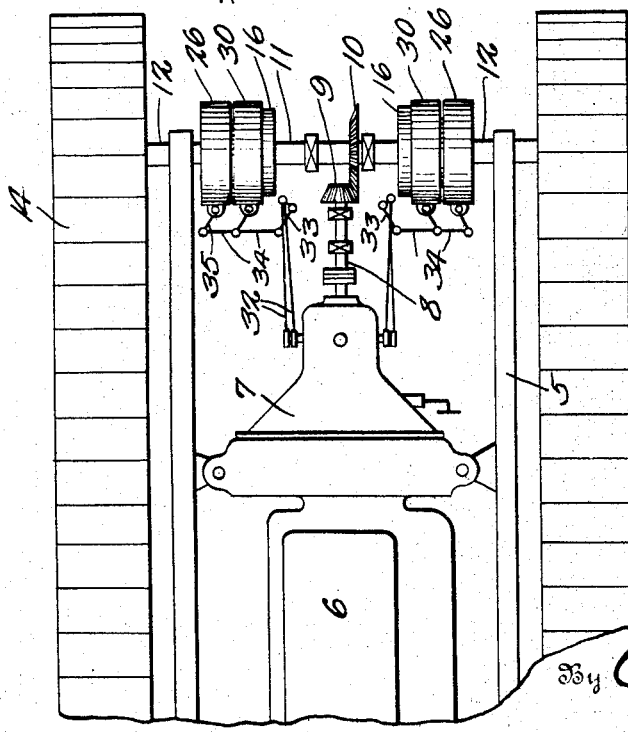
Figure 1 is a plan view of a machine having endless tread members and equipped with a steering mechanism constructed in accordance with the invention.
Figure 3:
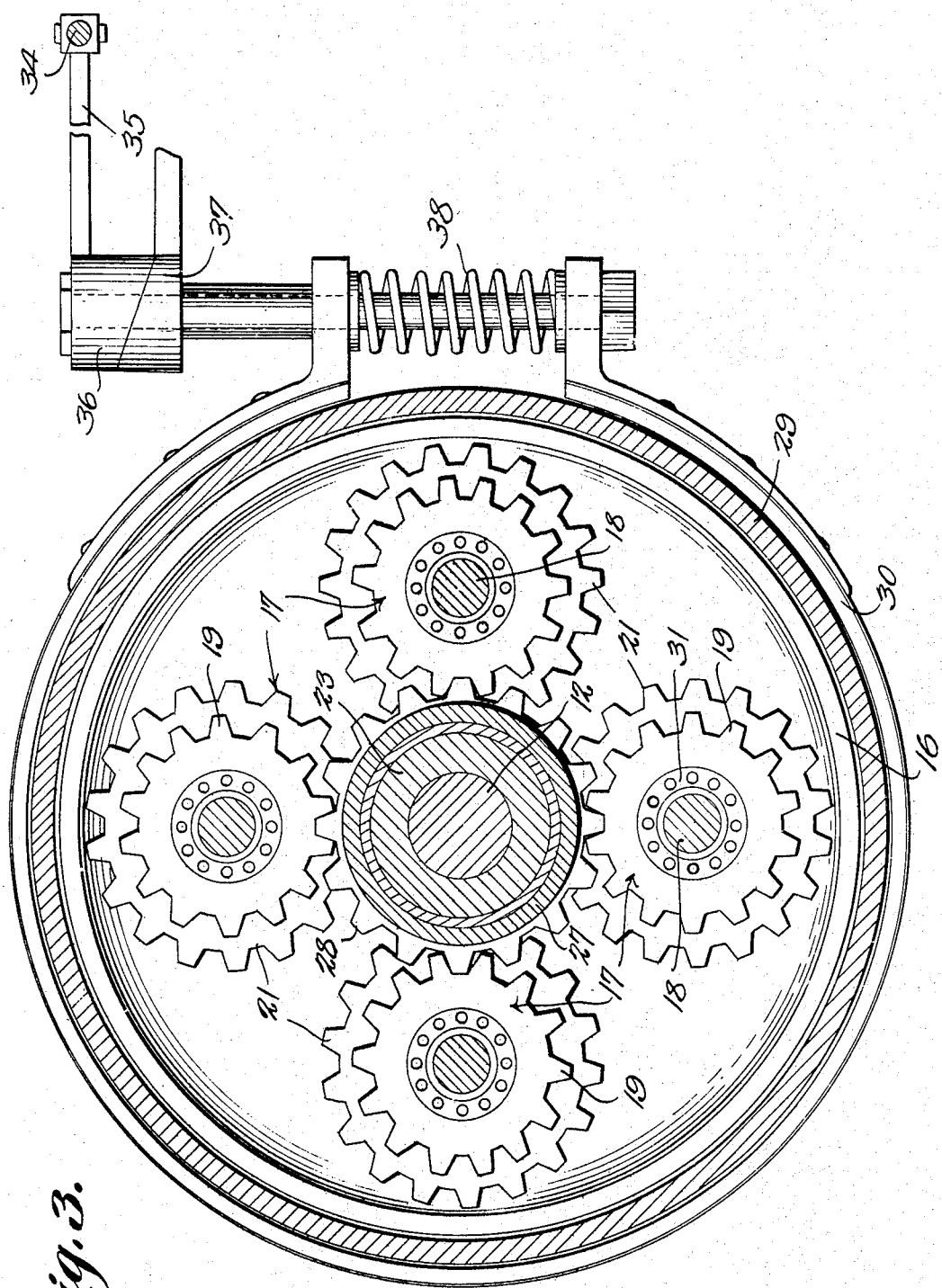
Figure 3 is a sectional view taken on line 3—3 of Figure 2.

Referring to the drawings in detail, the reference character 5 designates the frame of a tractor or similar machine, the same being supplied with the usual motor 6, transmission 7 and drive shaft 8, the drive shaft being supplied with a driving pinion.

The pinion 9 meshes with the ring gear 10 that is mounted intermediate the ends of the shaft 11 so that movement of the drive shaft 8 may be transmitted to the shaft 11. Openings are formed in the ends of the shaft 11 in which openings the shaft 12 extend, there being provided roller bearings 13 in the openings, on which the shafts 12 rotate.

Suitable wheels are mounted on the outer ends of the shafts 12 over which wheels the crawlers 14 or endless tread members operate. The shaft 11 carries gear housings 16 at its outer ends, the gear housings being keyed to the shaft to rotate therewith.

Planetary gears 17 are mounted in the circular gear housings 16, and as shown operate on the shafts 18, each of said gears comprising outer gear teeth 19 and 20 respectively, and inner gear teeth 21, the gear teeth 20 being in mesh with the teeth of the gear 22 that is keyed to shaft 12, associated therewith, so that rotary movement of the shaft 11 may be imparted to the shafts 12, through the gearing.

Mounted on the inner end of each shaft 12, is a tubular member or sleeve 23 which is provided with teeth at one end providing a gear 24 that is constantly in mesh with the teeth of gear 21, the outer end of the member 23 being keyed to the drum 25 so that the drum 25 rotates with the sleeve 23.

The reference character 26 indicates the band that cooperates with the drum 25 for gripping the drum 25 to lock it against movement. Sleeve 27 is mounted on the sleeve 23 to rotate therearound, the sleeve 27 being provided with a gear 28 that meshes with the gear members 19 at the outer ends of the gear 17. Secured to the sleeve 27 is a drum 29 that rotates with the sleeve 27, under normal conditions. Cooperating with the drum 29, is a band 30 which is adapted to grip the drum 29 and hold it against movement.

The planetary gears operate over the roller bearings 31 that are mounted on the shafts 18. As clearly shown by Figure 2 of the drawings, the construction of the gears 17 is such that the usual planetary gear construction is provided and may be operated to cause the shafts 12 to rotate simultaneously to operate the endless tread members in a forward direction, or they may be operated to cause one of the tread members to move in a forward direction while the other operates in a reverse direction.

The bands 26 and 30 of each set of gearing, are actuated by means of the rods 32 that connect with the bell crank levers 33 that in turn have connection with the rods 34, the rods 34 being connected with the arms 35 that carry the cam members 36 at their outer ends. These cam members 36 operate over the cam members 37 so that as the members 36 are rotated over the members 37, the ends of the bands may be moved towards each other, causing the bands to clamp their drums.

Coiled springs 38 are disposed between the ends of the bands so that the ends of the bands will be separated, under normal conditions.

I claim:

A power operated tractor guiding device comprising driven shafts having bearing openings in the outer ends thereof, wheel supporting driven shafts having the inner ends thereof extended into the bearing openings in the ends of the first mentioned driven shafts, gear housings secured to the outer ends of the first mentioned driven shafts, shafts journaled in the housings, planetary gear members mounted on the last mentioned shafts and including end gears and intermediate gears, said gears being of various sizes, gears secured on the inner ends of the wheel supporting shafts and meshing with certain of the gears of the planetary gearing, sleeves mounted on the wheel supporting shafts and having gears at the inner ends thereof meshing with the intermediate gears of the planetary gearing, brake drums secured to the outer ends of the sleeves, sleeves mounted on the first mentioned sleeves and having gears at the inner ends thereof meshing with the gears of the planetary gearing, drums secured to the outer ends of the last mentioned sleeves to move therewith, and brake bands cooperating with the drums for locking either of the sleeves or both of the sleeves against movement to vary the speed of rotation of the driven shafts with respect to each other, a driven shaft, and crawlers mounted on the wheels of the wheel supporting shafts to propel or guide the tractor.

In testimony that I claim the foregoing as my own, I have hereto affixed my signature.

ROBERT F. SCOTT.